United States Patent [19]

Stover

[11] 4,287,593
[45] Sep. 1, 1981

[54] PRESERVATION OF EQUAL TIME DELAYS FOR DIFFERENT PATHS THROUGH DIGITAL COMMUNICATIONS REPEATERS

[75] Inventor: Harris A. Stover, Vienna, Va.

[73] Assignee: The United States of America as represented by the Secretary of the Army, Washington, D.C.

[21] Appl. No.: 10,765

[22] Filed: Feb. 9, 1979

Related U.S. Application Data

[63] Continuation-in-part of Ser. No. 808,010, Jun. 20, 1977, Pat. No. 4,142,069.

[51] Int. Cl.$^3$ ............................................. H04J 3/06
[52] U.S. Cl. ................................... 370/103; 370/108
[58] Field of Search ......... 179/15 AQ, 15 AT, 15 BS; 320/103, 108

[56] References Cited

U.S. PATENT DOCUMENTS

| 3,688,049 | 8/1972 | Schlichte | 179/15 AQ |
| 3,906,159 | 9/1975 | Lutz | 179/15 AQ |
| 4,142,069 | 2/1979 | Stover | 179/15 BS |

OTHER PUBLICATIONS

*The Bell System Technical Journal;* vol. XXXVIII, No. 4; Jul. 1959, "Research Model for Time-Separation Integrated Communication", by Vaughn.
*Proceedings, IEE;* vol. 113, No. 9; Sep. 1966; "Synchronisation of a p.c.m. network using digital techniques", by Mumford et al.

*Primary Examiner*—David L. Stewart
*Attorney, Agent, or Firm*—William G. Gapcynski; Werten F. W. Bellamy; Sherman D. Winters

[57] ABSTRACT

When one time reference distribution node is referenced to another time reference distribution node through a repeater, the same delays are put into signals transmitted from the repeater that are in signals received by the repeater. This is accomplished by introducing variable storage buffers into the paths of signals transmitted from the repeater, and by providing for their control. Since the same delays are added to signals transmitted to a node that are in the signals received from that node, the difference in signal transit times in the two directions of transmission on a duplex transmission path is minimized. Accordingly, the transit time in both directions of transmission between any pair of nodes, which are communicating through the repeater, is essentially the same, and high accuracy is maintained for time reference distribution among the nodes of an electronic network.

5 Claims, 4 Drawing Figures

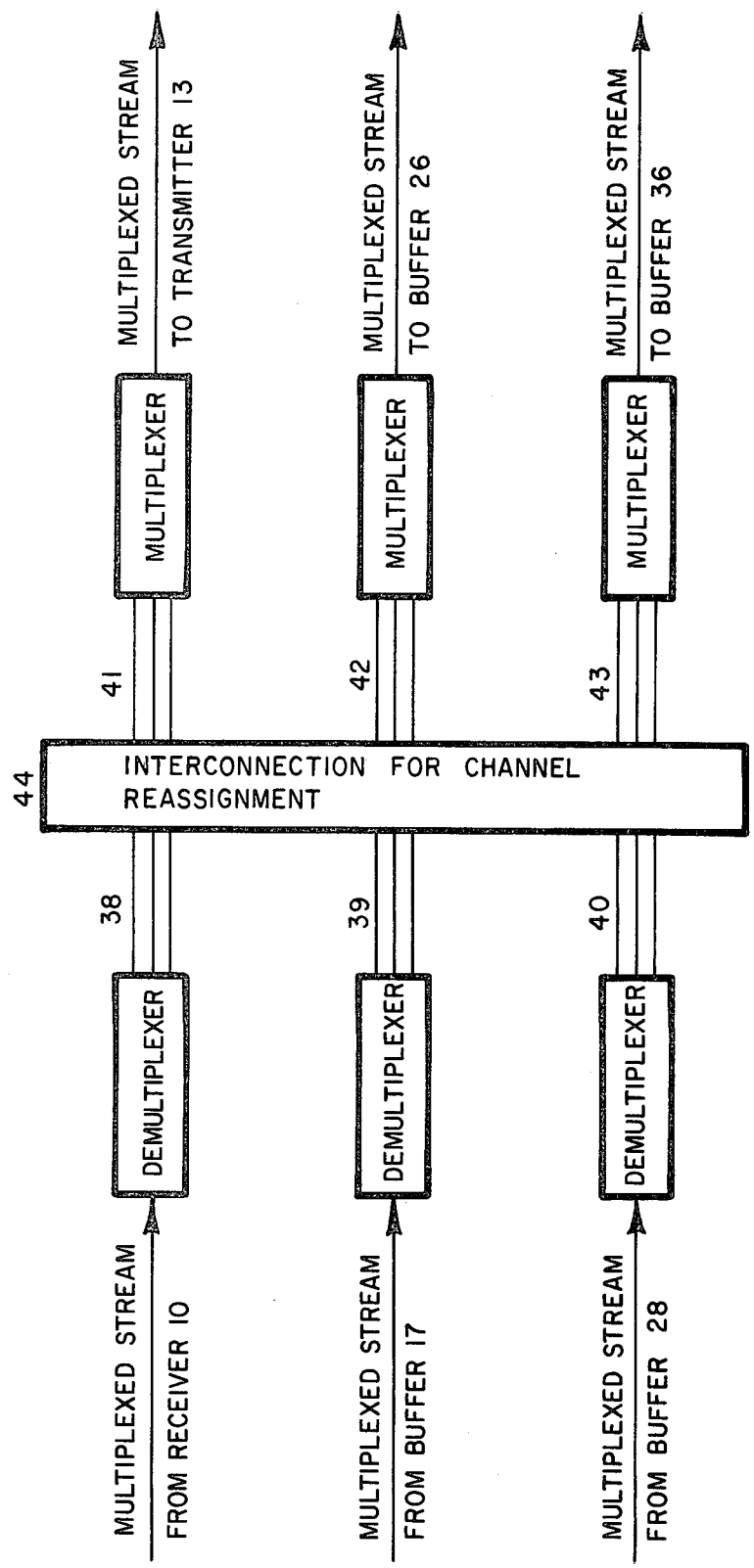

PRESERVATION OF EQUAL TIME DELAYS FOR DIFFERENT PATHS THROUGH DIGITAL COMMUNICATIONS REPEATERS

This application is a continuation-in-part of Ser. No. 808,010, entitled "An Improved Time Reference Distribution Technique", filed on June 20, 1977, now U.S. Pat. No. 4,142,069 issued Feb. 27, 1979.

BACKGROUND OF THE INVENTION

When a time reference distribution technique is employed for synchronizing an electronic network, differences in transmission times (signal transit times) in the two directions of transmission on a duplex transmission path can introduce inaccuracies. Although time reference distribution systems will be more accurate than other systems in any event, it is desirable to keep such differences in transmission times low in order to increase the high accuracy of the time reference distribution technique. It is desirable to keep such differences in transmission times low when one time reference distribution node is referenced to another time reference distribution node through a repeater or other intermediate node where multiplex/demultiplex functions occur.

SUMMARY OF THE INVENTION

Accordingly, when a time reference distribution technique is employed for synchronizing an electronic network, e.g., a digital communications network, it is an object of this invention to minimize the difference in transmission times (signal transit times) in the two directions of transmission on a duplex transmission path.

Another object of the invention is to minimize such difference in transmission times when one time reference distribution node is referenced to another time reference distribution node through a repeater or other intermediate node where multiplex/demultiplex functions occur.

Another object of the invention is to improve the accuracy of the system disclosed and claimed in my Patent Application Ser. No. 808,010, entitled "An Improved Time Reference Distribution Technique", filed on June 20, 1977, now U.S. Pat. No. 4,142,069.

Another object of the invention is to realize a saving of transmitters and receivers in a time reference distribution system.

Yet other objects of the invention will become apparent to those of ordinary skill in the art upon reading this disclosure.

The above objects are achieved by providing means for preserving essentially the same signal transit time in both directions of transmission on a duplex transmission path through said means in a time reference distribution system. One embodiment of my invention is an apparatus which comprises:

a. a plurality of receivers, each of which receives an incoming signal from a different node of an electronic network;

b. a plurality of transmitters, paired with the corresponding receivers, each of which transmits an outgoing signal to a node of the electronic network from which a signal is received;

c. a demultiplexer/multiplexer, which provides demultiplexing of each received signal and reassignment of each demultiplexed channel to establish new combinations which are multiplexed for transmission, thus permitting duplex communications among all of the nodes which interface with one another through the apparatus;

d. a first set of variable storage buffers between the receivers and the demultiplexer/multiplexer, which insures through appropriate control means that the incoming signals are in synchronism as they arrive at the demultiplexer/multiplexer;

e. a second set of variable storage buffers, each buffer interposed between the demultiplexer/multiplexer and a transmitter; and f. means for controlling the second set of variable storage buffers in such manner that they add delays to signals transmitted to nodes that are essentially the same as delays that the first set of variable storage buffers put in the signals received from those same nodes.

BRIEF DESCRIPTION OF THE DRAWINGS

FIG. 4 illustrates in greater detail the function performed by demultiplexer/multiplexer 21 in FIG. 2.

DETAILED DESCRIPTION OF THE INVENTION

Figure 1:
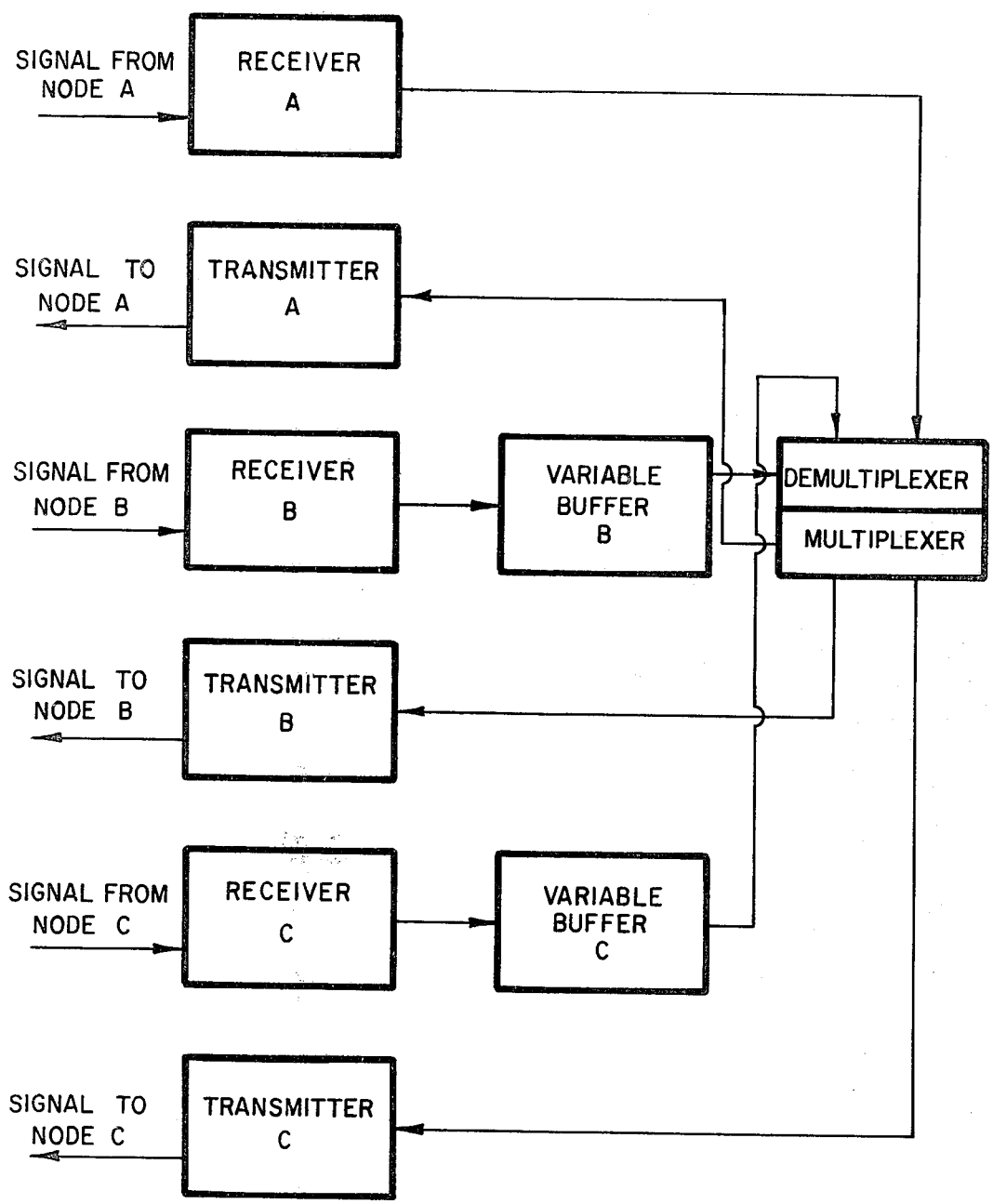
FIG. 1 is a block diagram showing a repeater where signals from three nodes arrive, are demultiplexed, assigned to interfacing nodes, and multiplexed for transmission. This permits duplex communications among the three nodes, which interface with one another through the repeater.

Referring first to FIG. 1, assume that node A is farthest from the repeater so that the signal transit time from node A is greater than that from nodes B or C. Then the signals from nodes B and C arrive too soon to be multiplexed properly with that from node A, i.e., they are not synchronized with the signal from node A. Therefore, for the signals from nodes B and C to be time division multiplexed (after demultiplexing) properly with the signal from node A, the signals arriving from nodes B and C should be given additional time delay to bring them into synchronism with that from node A. This is accomplished by variable storage buffers B and C, in which the signals are placed as received and read out at the proper time under the control of a local clock signal. However, the variable storage buffers introduce delays into the signals received from nodes B and C that are not in the signals transmitted from the repeater to these nodes, so that the signal transit times in the two directions over these paths will differ. The instant invention teaches how additional variable storage buffers can be introduced into the paths of signals transmitted from the repeater to nodes B and C, so that the differences in signal transit times in the two directions over these paths do not occur. The instant invention adds variable storage buffers and provides for their control in such manner that they introduce essentially the same delays to signals transmitted to each node which were previously added to the signals arriving from that node.

Turning to FIG. 2, node A is again farthest from the repeater and the signal from node A is received on receiver 10. Since this is the latest signal to arrive, it requires no further buffering. It is passed directly to demultiplexer/multiplexer 21. It is also passed to frame detector 11. The output of frame detector 11 is used to control clock 12, which is the basic clock for the demultiplexer/multiplexer 21 and assures that the demultiplexer/multiplexer 21 is operating in synchronism with the signal received from node A. Since the signal received from node A gets no variable buffering upon entry into the repeater, no additional variable buffering is provided for the signal transmitted back to node A; for this path, the transit time in the two directions is preserved without additional buffering. The signal for node A goes directly from demultiplexer/multiplexer 21 to transmitter 13.

The signal from node B is received by receiver 16. Since its path to the repeater is shorter than the path from node A, it needs additional variable storage buffering to bring it into synchronism with the signal from node A, so it is passed to variable storage buffer 17. The output of buffer 17 goes to frame detector 18. The output from frame detector 18 goes to comparitor 14 where it is compared with the output of frame detector 11. The output of comparitor 14 is used to adjust clock oscillator 15, which controls the readout of the signal from buffer 17 to bring that signal into synchronism with the signal from receiver 10. Similarly, the signal from node C is received by receiver 27 and passed to variable storage buffer 28. The output of buffer 28 goes to frame detector 32. The output of frame detector 32 goes to comparitor 30, where it is compared with the output of frame detector 11. The output of comparitor 30 is used to adjust clock oscillator 29, which controls the readout of the signal from buffer 28 to bring that signal into synchronism with the signal from receiver 10. Therefore, the signals from all three nodes as they come from receiver 10, variable storage buffer 17, and variable storage buffer 28 are in synchronism when they reach demultiplexer/multiplexer 21. Since the multiplexing function and demultiplexing function are controlled by the same clock 12, the signals to the three nodes are also in synchronism, i.e., their frames start at the same time, when they leave the demultiplexer/multiplexer 21 for transmission to the three nodes.

However, since delays were put into the signals received from nodes B and C, the same delays must be introduced into the signals transmitted back to these nodes in order to preserve essentially the same signal transit times in both directions between every pair of the nodes A, B, and C. To accomplish this, variable buffer 26 is introduced into the path of the signal from demultiplexer/multiplexer 21 to transmitter 25. Buffer fill detector 19 detects the fill of buffer 17 to a small fraction of a bit (a fraction of a bit is a relative phase measurement). Another buffer fill detector 22 detects the fill of buffer 26 to a small fraction of a bit. The output from buffer fill detector 22 goes to comparitor 23, where it is compared with the output of buffer fill detector 19. The output of comparitor 23 is used to adjust clock oscillator 24, which in turn causes bits to be removed from buffer 26 in such fashion that the fill of buffer 26 is identical to that of buffer 17. Therefore, the delays introduced by variable buffers 26 and 17 are the same for signals going both ways between node B and the repeater. Similarly, variable buffer 36 is introduced into the path between demultiplexer/multiplexer 21 and transmitter 35. Buffer fill detector 31 detects the fill of buffer 28 to a small fraction of a bit. Another buffer fill detector 33 detects the fill of buffer 36. The output of buffer fill detector 33 goes to comparator 34, where it is compared with the output of buffer fill detector 31. The output of comparator 34 is used to adjust clock oscillator 37, which causes bits to be removed from buffer 36 in such fashion that the fill of buffer 36 is identical to that of buffer 28. Therefore, the delays introduced by variable buffers 28 and 36 are the same, and signals going both directions between node C and the repeater are delayed by the same amount.

By applying this approach of putting the same buffer delays into signals transmitted from the repeater as are in signals received by the repeater, the transmission delays in the two directions of transmission on a duplex transmission path through the repeater are essentially the same. Accordingly, the total signal transit time in the two directions for any pair of the three nodes is essentially the same, which permits high accuracy to be maintained for time reference distribution among the nodes of the digital communications network.

Figure 2:
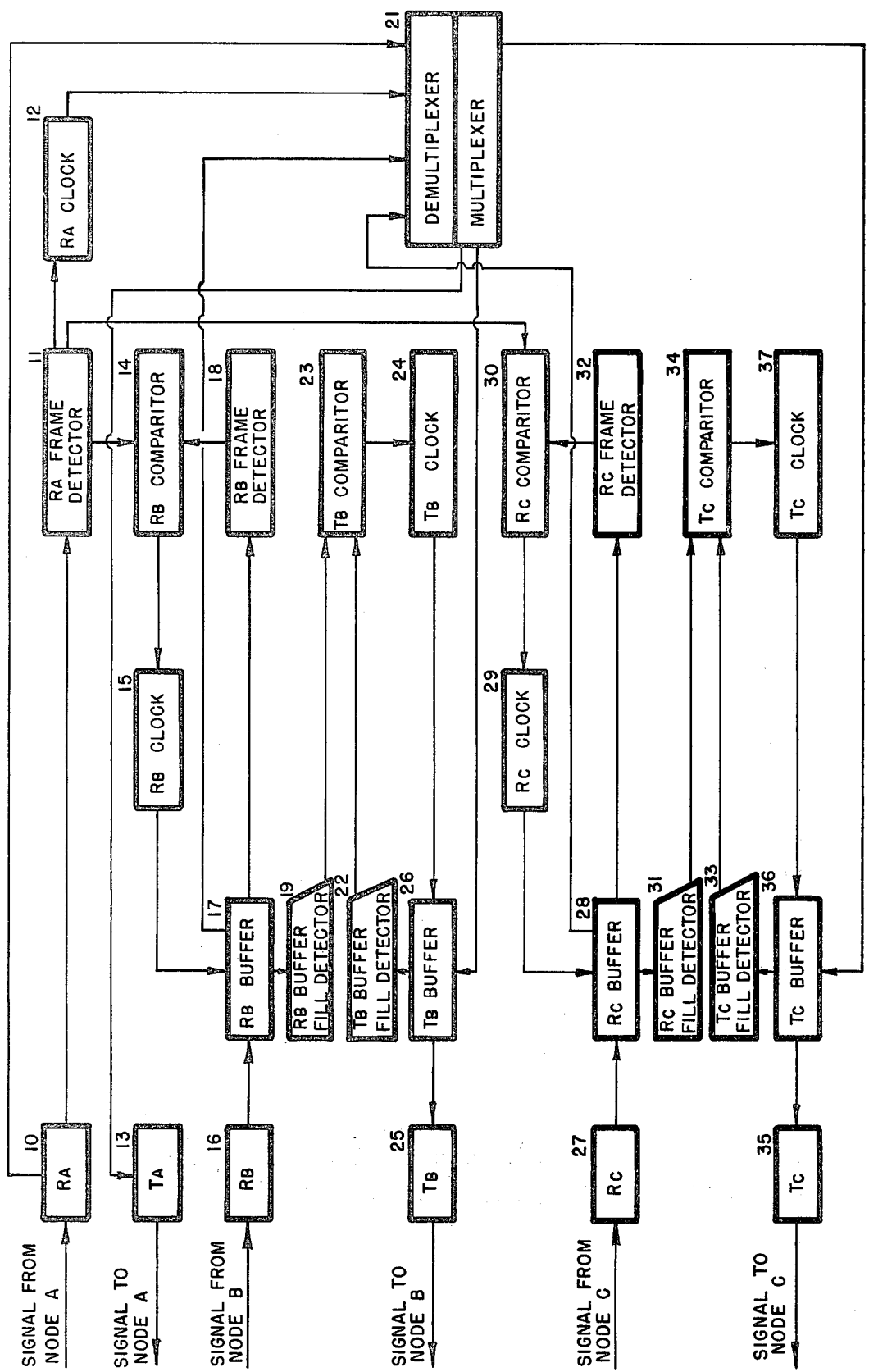
FIG. 2 is a block diagram showing a three-way repeater according to this invention, which preserves essentially the same signal transit time in both directions of transmission for each duplex transmission path between any two interfacing nodes.

While the above description is in terms of three transmitter-receiver pairs at the repeater (or three transmission paths to and from the repeater), it will be apparent to one of ordinary skill in the art that the teaching of this invention applies in general to a plurality of transmitter-receiver pairs or transmission paths. In this regard, FIGS. 1 and 2 illustrate nodes A, B, and C while, in general, there could be nodes A, B, ... N, where N is any selected stopping point in an alphabetically ordered multinode sequence. Indeed, the invention applies to any situation where electronic time transfers are made among multiple locations, with the signals passing through a single common transmission node. In order to make a precise electronic transfer of time between two locations, means must be provided to remove the error introduced by the time it takes the signal to travel from one location to the other. This would be accomplished electronically by passing the electronic signals both directions over the path in some process that would allow the signal transit time to be removed from the time comparison of the clocks at the two ends of the transmission path. Such removal of the signal transit time from the time comparison is dependent on the signal transit time in the two directions being the same, or in knowing exactly how much difference in transit time exists in the two directions. This invention provides means by which the signal transit times for signals passing both directions through a common node can be kept the same, even when the signals originate from multiple locations. The invention also permits the signals from the different locations to be aligned in time for demultiplexing of time division multiplexed digital signals and remultiplexing in new combinations.

My invention is particularly useful in a situation where more than two nodes have paths between them that pass through a single repeater. In a repeater serving only two nodes, there is only a single path involved, and for this path to be a duplex path the repeater must provide two receivers and two transmitters. In this event, the present invention does not provide a saving of transmitters and receivers. However, if the repeater is serving multiple paths connecting N nodes, i.e., the paths between all pairs of N nodes, there are $N(N-1)/2$ possible paths involved. While two repeater transmitters and repeater receivers could be provided for each possible path, i.e., treating them as $N(N-1)/2$ independent paths, that would require $N(N-1)$ receivers and $N(N-1)$ transmitters at the repeater. Instead, by multiplexing all channels of a particular node on one transmitter and providing demultiplexing, reassignment, and remultiplexing at the repeater according to this invention, the repeater only requires N transmitters and N receivers. Similarly, if they are treated as independent paths, each node served must have N−1 transmitters and N−1 receivers or a total for the N nodes served by the repeater of N(N−1) transmitters and N(N−1) receivers for the signals through the repeater. However, when the multiplexing is used, each node served needs only 1 transmitter and 1 receiver or a total for the N nodes of N transmitters and N receivers for signals passing through the repeater. In sum, foror paths between all pairs of N nodes, the independent paths approach would require a total of $N(N-1)+N(N-1)=2[N(N-1)]=2N^2-2N$ transmitters and $2N^2-2N$ receivers, while with multiplexing it only requires a total of $N+N=2N$ transmitters and $2N$ receivers. Therefore, for a repeater serving N nodes, the saving in transmitters by multiplexing is $(2N^2-2N)-2N=2N^2-4N$ and the saving in receivers by multiplexing is $2N^2-4N$. There is no saving for two nodes; but for 3 nodes, 6 transmitters and 6 receivers are saved; for 4 nodes, 16 transmitters and 16 receivers are saved; while for 5 nodes, 30 transmitters and 30 receivers are saved. This invention permits the multiplexing of different paths through a single repeater to be provided while still preserving equal time delays for the two directions of transmission for each path through that branching repeater.

The description in connection with FIGS. 1 and 2 assumed that the signal transit time for the path from node A was sufficiently larger than the other paths to permit variable storage buffers to be inserted in those other paths in order to increase their transit times. In this fashion, the signal transit times from nodes B and C were increased and made equal to that from node A. If this condition does not exist (i.e., if the signal transit time from node A is not sufficiently longer), it can be artificially provided by introducing fixed buffers having the same time delay into the path of the signal received from node A and the path of the signal transmitted to node A. Once this is done, the basic description in connection with FIGS. 1 and 2 applies. The basic description can be made to apply to any combination of signal transit times for the associated signal paths.

FIG. 2 shows a demultiplexer/multiplexer 21 in which time division signals from three receivers are demultiplexed to recover the individual channels on each path. These individual channels are remultiplexed, with new groupings for each path, before transmission by the three transmitters. All variable buffers are shown on the combined channel side of all multiplexers and demultiplexers; indeed, in FIG. 2 the uncombined channel signals do not occur outside demultiplexer/multiplexer 21. However, given the principles of this invention, one of ordinary skill in the art could readily place the variable storage buffers on the uncombined side of the multiplexers and demultiplexers, if desired, and still achieve the same results described herein.

In general, this invention is useful in connection with any time reference distribution technique in which a plurality of signals arrive at receivers within a repeater or other intermediate node where multiplex/demultiplex functions occur. The invention is particularly advantageous for use in connection with my invention in Patent Application Ser. No. 808,010, entitled "An Improved Time Reference Distribution Technique", filed on June 20, 1977, now U.S. Pat. No. 4,142,069. In that application, I disclose and claim a time reference distribution system for distributing an accurate time reference to a plurality of nodes of an electronic network, paths connecting each node to one or more neighboring nodes, which distribution system can also be used to synchronize the network, each node including: a local clock, means for measuring the local clock's time error relative to a system master clock, means for weighting (where such weighting may include a selection function) the paths connecting the nodes over which the time reference is distributed through the network, and means for correcting the time error of the local clock so that said means for measuring the local clock's time error is not affected by the correction of the clock error at any other node and so that the time reference distribution system does not contain any closed distribution paths.

In FIG. 2 of Ser. No. 808,010, assume that the path between major nodes D and L has a multiplexing repeater R inserted through which signals pass in going from node D to node L, and that an additional major node M gains access to the remainder of the network through repeater R. This is illustrated in instant FIG. 3. Then, the present invention provides the means by which the signal transit time of the signal through the repeater R going from node D to node L is kept the same as the signal transit time through the same repeater R going from node L to node D. Likewise, it provides the means to keep the signal transit time from D to M the same as that from M to D, and the signal transit time from L to M the same as that from M to L. It also provides for the alignment of the frames for proper multiplexing in the repeater R.

Figure 3:
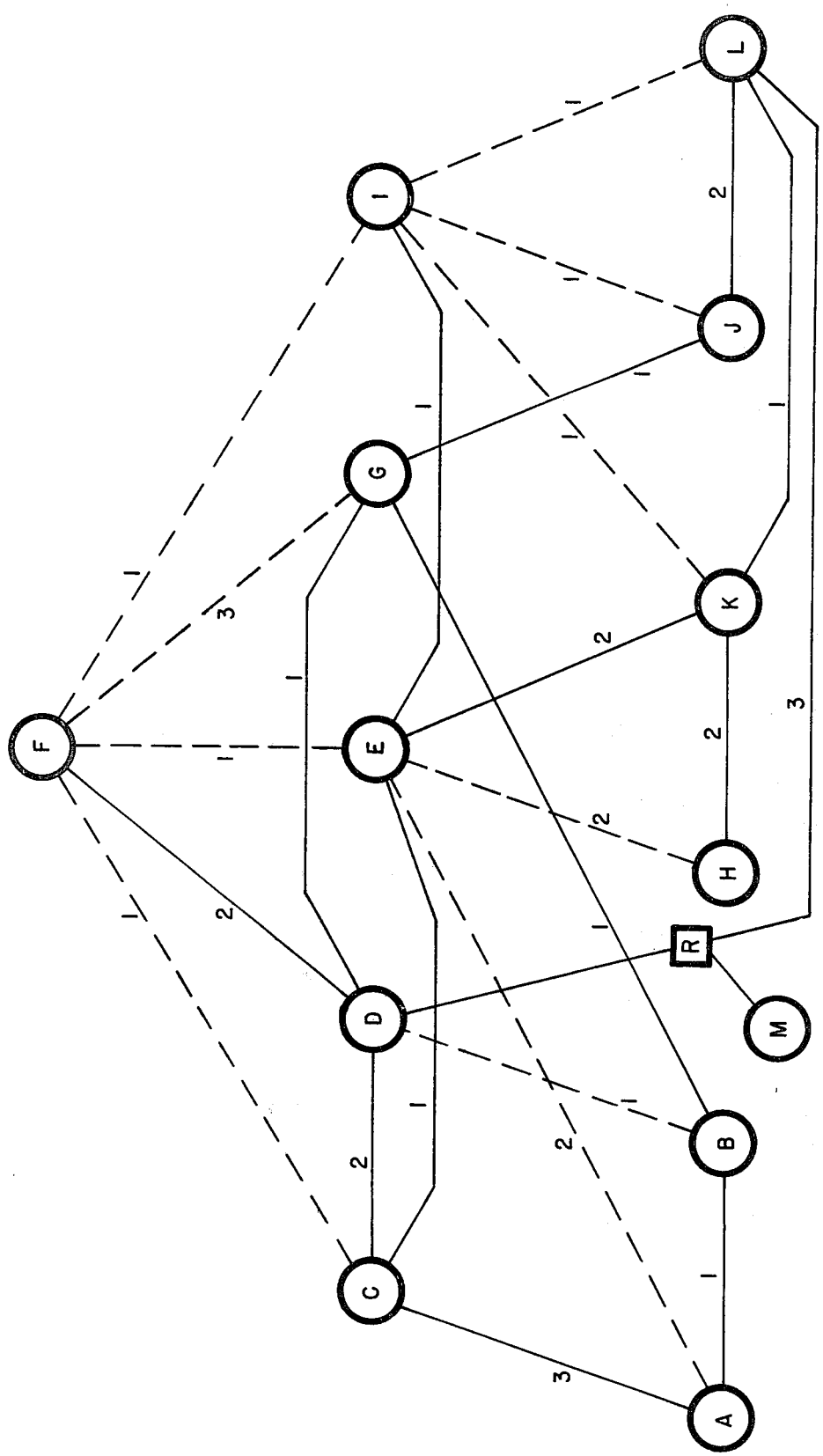
FIG. 3 is identical to FIG. 2 in Ser. No. 808,010, except that repeater R and major node M have been added to the network in FIG. 3.

While FIG. 3 illustrates how repeater R can be interposed at one point in the time reference distribution system of Ser. No. 808,010, it will now be apparent to those of ordinary skill in the art that one or more repeaters can be similarly interposed in the system at any desired point(s). Further, it is important to distinguish between repeater R and the other major nodes, which have a greater timing capability than that available at the repeater. The repeater, which is not an active timing node, passes all information accurately to its neighbors, so that they can fully participate in time reference distribution without accuracy degradation due to the presence of the repeater. Moreover, the repeater provides demultiplexing, channel reassignment, and remultiplexing, as more fully described below with reference to FIG. 4.

FIG. 4 shows in greater detail the function performed by demultiplexer/multiplexer 21 in FIG. 2. As shown, each received multiplexed bit stream is demultiplexed, i.e., broken down into channels, and any channel of any received multiplexed bit stream can be reassigned to any of the multiplexed bit streams subsequently transmitted. The channels are reassigned in element 44. For example, after demultiplexing, channels from 39 and 40 are reassigned in 44; the resultant new grouping of channels 41 is multiplexed into the multiplexed bit stream going to transmitter 13. Similarly, channels from 38 and 40 are reassigned to the multiplexed bit stream going to buffer 26, and channels from 38 and 39 are reassigned to the multiplexed bit stream going to buffer 36. While FIG. 4 relates to three nodes, it will be understood that, in general, any of the channels from any one of N directly connected nodes can be transmitted to any of the other N−1 directly connected nodes.

Although I have herein described the specific features of my invention, I do not wish to be restricted to these specific features, since many variations will now be apparent to those skilled in the art.

I claim:

1. A time reference distribution system for distributing an accurate time reference to a plurality of nodes of an electronic network wherein each node of said network comprises:
   a. a local clock;
   b. means for measuring the local clock's time error relative to a system master clock;
   c. means for weighting (where such weighting may include a selection function) the paths connecting the nodes over which the time reference is distributed through the network; and
   d. means for correcting the time error, of the local clock so that said means for measuring the local clock's time error is not affected by the correction of the clock error at any other node and so that the time reference distribution system does not contain any closed distribution paths; paths connecting each node to one or more neighboring nodes, which distribution system can also be used to synchronize the network and which network contains means for preserving essentially the same signal transit time in both directions of transmission on a duplex transmission path through said means which comprises:
   (1) a plurality of receivers, each of which receives an incoming signal from a different node of an electronic network;
   (2) a plurality of transmitters, paired with the corresponding receivers, each of which transmits an outgoing signal to a node of the electronic network from which a signal is received;
   (3) a demultiplexer/multiplexer, which provides demultiplexing of each received signal and reassignment of each demultiplexed channel to establish new combinations which are multiplexed for transmission, thus permitting duplex communications among all of the nodes which interface with one another through the apparatus;
   (4) a first set of variable storage buffers between the receivers and the demultiplexer/multiplexer, which insures through appropriate control means that the incoming signals are in synchronism as they arrive at the demultiplexer/multiplexer;
   (5) a second set of variable storage buffers, each buffer interposed between the demultiplexer/multiplexer and a transmitter; and
   (6) means for controlling the second set of variable storage buffers in such manner that they add delays to signals transmitted to nodes that are essentially the same as delays that the first set of variable storage buffers put in the signals received from those same nodes.

2. The system of claim 1 wherein the electronic network is a digital communications network.

3. The system of claim 1 wherein the plurality of receivers is three receivers.

4. The system of claim 1 wherein the plurality of receivers is more than three receivers.

5. The system of claim 1 wherein the means for controlling the second set of variable storage buffers comprises:
   (1) for each buffer in the first set of variable storage buffers, a buffer fill detector which detects its fill;
   (2) for each corresponding buffer in the second set of variable storage buffers, another buffer fill detector which detects its fill;
   (3) for each pair of buffer fill detectors (1) and (2), a comparator which compares the outputs of these detectors; and
   (4) for each comparator (3), a clock oscillator which is adjusted by the output of comparator (3) and which, in turn, controls the readout from said corresponding buffer in the second set of variable storage buffers such that its fill is identical to that of said buffer in the first set of variable storage buffers.

* * * * *